Jan. 29, 1963 W. SIMON 3,076,054

X-RAY SYSTEM

Filed Nov. 27, 1959 2 Sheets-Sheet 1

INVENTOR.
WILLIAM SIMON

BY Ezekiel Wolf, Wolf + Greenfield

ATTORNEYS

Jan. 29, 1963 W. SIMON 3,076,054
X-RAY SYSTEM
Filed Nov. 27, 1959 2 Sheets-Sheet 2

INVENTOR.
WILLIAM SIMON
BY
Ezekiel Wolf, Wolf + Greenfield
ATTORNEYS

United States Patent Office 3,076,054
Patented Jan. 29, 1963

3,076,054
X-RAY SYSTEM

William Simon, Cambridge, Mass., assignor to Image Instruments, Inc., Newton Lower Falls, Mass., a corporation of Delaware
Filed Nov. 27, 1959, Ser. No. 855,744
15 Claims. (Cl. 178—6.5)

The present invention relates in general to X-ray systems and more particularly concerns a novel system in which a television camera and image storage tube are employed to maximize the detail and information presented to the diagnostic observer while minimizing the exposure of the patient to radiation. At the same time, system components are arranged for maximum operating flexibility while efficiently employing standard component parts. An X-ray system according to the invention presents either static or dynamic stereoscopic displays while minimizing exposure to radiation.

For many years X-ray examination has been an important diagnostic tool for industry and the medical profession. Both X-ray photographs and fluoroscopic presentations are extensively employed to observe internal portions of a structure or patient. In recent years, the seriousness of overexposure to radiation has been recognized and efforts have been directed toward minimizing such exposure. One approach employs image intensifiers so that a low contrast X-ray image will appear with normal contrast after amplification by the image intensifier. While this permits a reduction in radiation intensity, the weak optical input signal to the intensifier results in a relatively low signal-to-noise ratio.

Accordingly, the present invention contemplates and has as an important object the provision of an X-ray system characterized by high resolution, high signal-to-noise ratio and immediate availability of the desired image while minimizing exposure to radiation.

It is another object of the invention to provide an X-ray system in accordance with the preceding object which displays a three-dimensional representation of selected internal portions of an object being X-rayed.

Still another object of the invention is to achieve the preceding objects with a system employing essentially standard component parts arranged to operate with great reliability.

It is still another object of the invention to provide a system in accordance with the preceding object in which functions of individual components are maximally utilized throughout the system.

According to the invention, a source of object penetrative rays illuminates a screen sensitive to such rays, through an object to be examined. The image produced upon the screen is scanned to provide a video signal to an image storage tube requiring only the video signal derived from scanning during a short time interval in order to store images produced on the sensitive screen for subsequent display. As a result, the duration of the image on the sensitive screen may actually be less than that required for perception by the human eye while the image storage tube preserves all details. Consequently, the duration of the exposure to the rays may be very short, thereby reducing the hazards of radiation exposure. Preferably, excitation of the ray source occurs in predetermined time relationship with the transfer of video signals to and from storage. This aids in keeping radiation exposure to a minimum because the source may be excited only for a very short time interval, preferably just before scanning.

An important feature of the invention resides in providing spaced sources of X-rays which separately expose the X-ray sensitive screen through the object during mutually exclusive time intervals to provide a stereoscopic display of selected portions of the internal structure of the object.

In a preferred embodiment of the invention, a television tube display is also provided for displaying the image stored by the image storage tube. This is advantageous because it permits monitoring in well-lighted rooms. Preferably, the scanning rates of the storage tube unit and television picture tube display unit are synchronized with that of the television camera so that a single source of synchronization signals suffices for the entire system.

Still another feature of the invention resides in the provision of means for sequentially scanning and storing successive images to dynamically and stereoscopically display the selected internal portion of the X-rayed object while minimizing radiation exposure.

Other features, objects and advantages of the invention will become apparent from the following specification when read in connection with the accompanying drawing in which.

Figure 1:
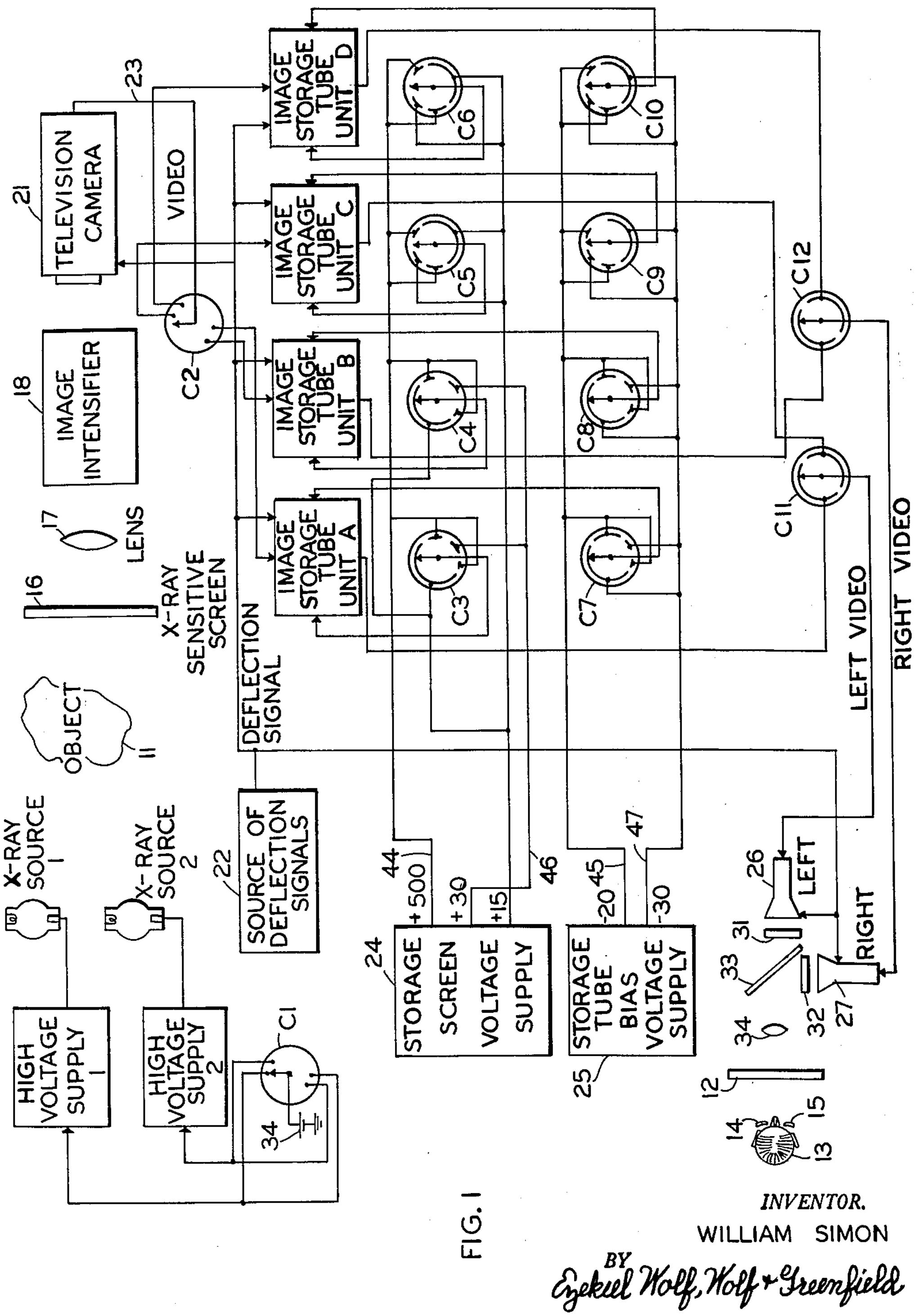
FIG. 1 is a block diagram of an exemplary embodiment of the invention.

With reference now to the drawings and more particularly FIG. 1 thereof, there is shown a block-pictorial representation of an exemplary embodiment of the invention for selectively providing dynamic or static stereoscopic display of the X-rayed object while minimizing exposure time. To avoid obscuring the inventive concepts, the old component parts of the system are represented by an appropriately identified block or pictorial symbol. In the exemplary embodiment of the invention, the system is programmed by means of commutating switches designated C1–C12, the rotor of each switch being attached to a common shaft with the relation between the rotor arm and stator segments of the different switches shown at a particular instant of time when the first X-ray source is energized. While the specific switching system shown is advantageous from the standpoint of simplicity and reliability, it is to be understood that those skilled in the art may employ other types of programmers, including those which utilize electronic circuits, within the inventive concepts.

A selective internal portion of an X-rayed object 11 is stereoscopically displayed on the back-lighted projection screen 12 and viewed stereoscopically by the observer 13 wearing glasses with crossed polarization filters 14 and 15, respectively. X-ray sources 1 and 2 illuminate the X-ray sensitive screen 16 during mutually exclusive time intervals through the object 11 to produce an image of the desired internal portion on screen 16 related to the direction of the X-rays then penetrating the object.

A lens 17 focusses the image of screen 16 upon the image intensifier 18. The amplified image is scanned by the television camera 21, which receives vertical and horizontal deflection signals from the deflection signal source 22. The video signal derived from scanning the intensified image is delivered to that one of the image storage tube units A–D connected to the video output line 23 by the commutating switch C2.

The commutating switches C3–C6 deliver appropriate storage screen voltages to image storage tube units A–D from the storage screen voltage supply 24 in accordance with a program described in detail below. Commutating switch C7–C10 deliver biasing potentials to image storage tube units A–D, respectively, from storage tube bias voltage supply 25, also in accordance with the prescribed program.

A video signal for the left eye display is selectively transferred from the output of image storage tube unit A to image storage tube unit C by commutating switch C11 while the video signal for the right eye display is selectively transferred between the output of image storage tube unit B and that of image storage tube unit D by commutating switch C12. The left and right video signals are delivered to left and right display projection tubes 26 and 27, respectively. The latter tubes receive deflection signals from the source 22.

Crossed polarization filters 31 and 32 are placed between the faces of tubes 26 and 27, respectively, and half-silvered mirror 33. The filtered image from tube 26 is transmitted through the half-silvered mirror 33 and forcussed by the lens 34 on the back lighted projection screen 12. The filtered image provided by display tube 27 is reflected by the half silvered mirror 33, and the reflected image focussed by lens 34 upon the screen 12. The polarization of lenses 14 and 15 corresponds to that of filters 31 and 32, respectively, so that the left eye sees the image from display tube 26 while the right eye sees the image from display tube 27.

The X-ray sources 1 and 2 illuminate object 11 with X-rays when the respective high voltage supplies 1 and 2 are activated by being connected to battery 34 through commutating switch C1. If X-ray tubes having control grids are employed, both sources may share a common high voltage power supply. Communicating switch C1 would then remove a cutoff bias from the control grid of each tube at the appropriate time.

Briefly stated, the method carried out by the system of FIG. 1 and described in detail below, includes the following steps. The X-ray sources are flashed in sequence to emit X-rays penetrating the object and developing a pair of images of internal portions of the object on the X-ray sensitive screen as would be seen through respective eyes of the observer. These images are sequentially scanned by the television camera to provide a corresponding pair of video signals which are sequentially stored on the screens of one pair of image storage tubes. At the same time, the similar pair of images stored on the previous cycle on the screens of the other pair of storage tubes are displayed on respective ones of the display tubes.

On the next cycle, the latter pair of image storage tubes are erased and receive a new pair of images while the images stored on the first pair of image storage tubes are displayed on respective ones of the display tubes.

Figure 2:
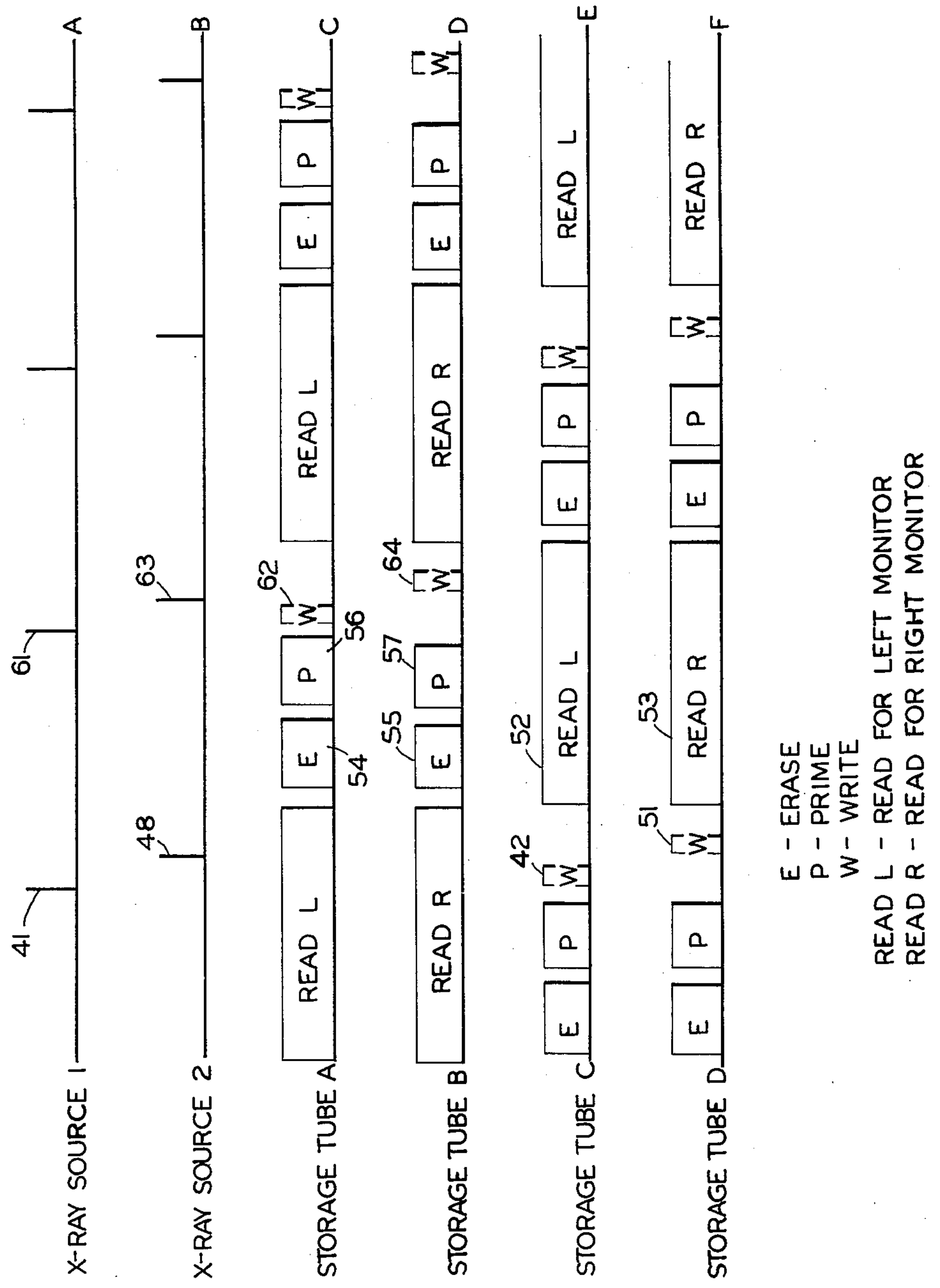
FIG. 2 is a timing diagram helpful in understanding the mode of operation of the system of FIG. 1.

The mode of operation will now be considered in greater detail. Referring to FIG. 2 there is shown a timing diagram helpful in understanding the steps of a novel method performed by the exemplary embodiment illustrated in FIG. 1. At the time represented by pulse 41 in FIG. 2A, the rotor arms are oriented as shown in FIG. 1, X-ray source 1 is emitting X-rays, Xray source 2 is off, storage tubes A and B are being read and storage tubes C and D have been primed preparatory to receiving the image on X-ray sensitive screen 16 due to the flashing of X-ray source 1. The latter screen provides short term storage so that the image may be transferred to a storage tube unit within a short time after the X-ray source 1 no longer emits X-rays.

While the specific form of the image storage tube units are not a part of this invention and are well-known to those skilled in the art, it is helpful in understanding this invention to briefly review the process of recording and recovering images. A typical storage tube unit includes essentially a cathode ray tube having a dielectric coated storage screen between the electron gun and a signal electrode with associated auxiliary apparatus, such as deflection circuits and components. Erasing of old stored data is accomplished by applying a relatively high potential, such as 500 volts to the storage tube screen and biasing the grid above cut off so that the electron beam charges the dielectric surface of the storage screen positively to substantially the same potential as the screen. Priming is accomplished by biasing the grid above cut off while applying a relatively low potential to the screen, such as 30 volts, so that the electron beam charges the dielectric surface negatively until it reaches cathode potential.

Writing is accomplished by applying a high voltage such as 500 volts to the screen, biasing the grid about cut off, and modulating the grid potential with the video signal to be stored as the electron beam is deflected across the screen. Reading is accomplished by applying a relatively low voltage to the screen, such as 15 volts, biasing the grid above cut off and utilizing the variations in beam current delivered to the signal electrode as the electron beam is swept across the screen as the output video signal. The screen potential is sufficiently low so that a point on the storage screen not charged by the beam on the previous Write cycle, will prevent the beam from reaching the signal electrode on the Read cycle. For a more detailed discussion of a storage tube, reference is made to "Improved Storage Tube Design" by Hergenrother et al. in Tele-Tech and Electronic Industries for March 1956.

Assuming the rotors of the commutating switches move clockwise, the next step in the program occurs when commutating switch C2 connects the video output of television camera 21 to the image storage tube unit C where it is written upon the storage screen of the tube during the time interval corresponding to the Write pulse 42 in FIG. 2E. During this interval, commutating switch C5 connects the screen of image storage tube unit C to the high voltage line 44 of storage screen voltage supply 24 and commutating switch C9 connects the grid of this tube to the higher biasing potential on line 45 of storage tube bias voltage supply 25. At the same time, commutating switches C3 and C4 connect the lowest potential line 48 of storage screen voltage supply 24 to image storage tube units A and B. Commutating switches C7 and C8 then connect the grids of the latter tubes to the lower biasing potential on line 47 of the storage tube bias voltage supply 25. Commutating switches C11 and C12 connect the read video output signal from storage tube units A and B, respectively, to the left projection display tube 26 and right projection display tube 27, respectively.

Assuming that the object 11 had not yet been exposed to X-rays before the time indicated by pulse 41, the observer 13 would only see a dark field then stored by storage tubes A and B.

As the rotor arms progress further clockwise, at the time corresponding to pulse 48 of FIG. 2B, commutating switch C1 activates high voltage supply 2 so that X-ray source 2 emits X-rays towards screen 16 through object 11. Shortly thereafter, commutating switch C2 connects the video output of television camera 21 to image storage tube unit D which then receives appropriate screen potentials and biasing potentials through commutating switches C6 and C10 substantially in the manner described above in connection with writing data upon the screen of image storage tube unit C. This occurs at the time represented by Write pulse 51 shown in FIG. 2F. During the time interval between pulses 42 and 51, the conditions on image storage tube units A and B remain unchanged so that the observer still sees only a dark field. At this time image storage tube units C and D store images for the left eye and right eye, respectively, of the desired internal portion of object 11.

With further clockwise rotation, the Read L and Read R pulses 52 and 53 are initiated so that commutating switches C11 and C12 then couple the video output signal representative of the image stored on image storage tube units C and D to the left display tube 26 and right display tube 27, respectively, the latter storage tube units receiving appropriate screen and biasing potentials through commutating switches C5, C6, C9 and C10.

Shortly thereafter, any image stored on storage tube units A and B are erased during the time interval represented by the Erase pulses 54 and 55, respectively, the commutating switches C3, C4, C7 and C8, delivering appropriate biasing and screen potentials to the latter storage tube units. Still later, during the time intervals corresponding to the Prime pulses 56 and 57, the latter storage tube units are primed; that is a black or dark field is written upon the screens preparatory to receiving the stored images. As indicated above, the appropriate commutating switches connect the proper screen and biasing potentials for the priming operation.

After the rotors have completed a half revolution, the commutating switch C1 again activates high voltage supply 1, causing X-ray source 1 to emit X-rays at a time corresponding to pulse 61 in FIG. 2A. Shortly thereafter, at a time corresponding to Write pulse 62, commutating switch C2 couples the video signal for storage from television camera 21 to image storage tube unit A which receives appropriate screen and biasing potentials through commutating switches C3 and C7.

With continued clockwise rotation of the rotors, high voltage supply 2 is activated and X-ray source 2 again emits X-rays through object 11 at a time corresponding to pulse 63 shown in FIG. 2B. Shortly thereafter, at a time corresponding to Write pulse 64 shown in FIG. 2D, commutation switch C2 couples the video output signal for storage from television camera 21 to image storage unit B which then receives appropriate biasing and screen potentials through commutating switches C4 and C8. During the next half revolution of the rotor arms, the video data in storage tube units A and B are transferred through commutating switches C11 and C12 respectively, to the left display tube 26 and right display tube 27, respectively.

It is thus seen that by using two pairs of storage tubes as disclosed herein, a quasi-motion picture presentation of the X-rayed object is stereoscopically displayed. While one pair of tubes is being prepared for and receiving a new pair of images, the images stored by the other pair of tubes are being displayed.

Certain features of the invention may be realized by utilizing a lesser number of storage tubes. For example, if the quasi-motion picture effect were not desired but the stereoscopic display were, image storage tube units C and D could be eliminated and the rotor stopped with the various commutating switch rotors contacting stator portions associated with the Read cycle after the image is stored.

If the quasi-motion picture effect is desired but stereoscopic display is not, then image storage tube units B and D may be eliminated along with associated commutating switches.

If neither quasi-motion picture effect nor stereoscopic display is desired, then a single image storage tube unit will suffice. Note that even with a single storage tube unit, a single flash of the X-ray source results in almost immediate availability of the X-rayed image for careful study without the delay and inconvenience associated with systems using photographic film while minimizing radiation exposure.

The system will still function to provide permanent recording of the X-rayed image merely by placing a piece of photographic film on the face of the display screen 12. This again results in minimization of radiation exposure since the film activating energy is light rather than X-rays.

Commutating switches have been shown directly coupling video signals to and from the different storage tube units. This is satisfactory in many practical applications where the switched video signal is delivered at a relatively high level from a low impedance output and the spectral components of the video signal of relatively low frequency components are present in the video signal, it is preferable to use coaxial cables for transmitting the video signals. Under such conditions, the commutating switches C2, C11 and C12 could be used to control solenoid-operated coaxial switches or control the conductivity of cathode follower stages isolating the television camera and display tubes from the image storage tube units.

There has been described an X-ray system capable of stereoscopically displaying a dynamic or static representation of internal portions of an object while minimizing radiation exposure. It is apparent that those skilled in the art may now make numerous modifications of and departures from the specific exemplary system described herein without departing from the inventive concepts. Consequently, the invention is to be construed as limited only by the spirit and scope of the appended claims.

What is claimed is:

1. Stereoscopic apparatus for displaying an image of internal portions of an object comprising, object penetrative ray sensitive means, means for providing said object penetrative rays from first and second sources positioned to direct said rays through said object upon said ray sensitive means from different directions, means for providing rays from said first and second sources during mutually exclusive time intervals to establish first and second images upon said ray sensitive means due to radiation from said first and second sources, respectively, and means for displaying said first image to one eye of an observer and said second image to the other eye of said observer to present to said observer a stereoscopic representation of said internal portions, said means for displaying comprising, means for scanning said ray sensitive means to provide first and second time-spaced video signals representative of said first and second images respectively, first and second image storage tubes respectively responsive to said first and second video signals for storing said first and second images respectively, first and second television picture tubes, means for continuously displaying a picture represented by the first stored video signal on said first picture tube, and means for continuously displaying a picture represented by the second stored video signal on said second picture tube.

2. Apparatus in accordance with claim 1 wherein said means for converting comprises a television camera, and said long term storage means comprises an image storage tube unit.

3. Stereoscopic apparatus in accordance with claim 1 and further comprising, first and second television picture tubes, third and fourth image storage tubes, means for causing said third storage tube to alternate with said first storage tube in receiving said first video signal and storing said first image, means for causing said fourth storage tube to alternate with said second storage tube in receiving said second video signal and storing said second image, means for alternately transferring said first image stored on said first and third storage tubes to said first picture tube, and means for alternately transferring said second images stored on said second and fourth storage tubes to said second picture tube.

4. Stereoscopic apparatus in accordance with claim 3 and further comprising, means for erasing the image previously stored on said first and second storage tubes and respectively storing said first and second images thereon during the time interval the previously stored first and second images are being transferred from said third and fourth storage tubes respectively to said first and second picture tubes respectively, and means for erasing the image previously stored on said third and fourth storage tubes and respectively storing said first and second images thereon during the time interval the previously stored first and second images are being transferred from said first and second storage tubes respectively to said first and second picture tubes respectively.

5. Stereoscopic apparatus in accordance with claim 4 and further comprising, means for superimposing the first and second images displayed by said first and second television picture tubes, and means for selectively transmitting respective ones of said superimposed images to respective ones of the eyes of an observer.

6. A method of stereoscopically displaying internal portions of an object which method includes the steps of directing object penetrative rays through said object toward means sensitive to said rays from a first perspective to produce a first image on said screen representative of said internal portions, storing said first image in first image storage means and displaying a previously stored first image on first image display means, directing object penetrative rays through said object toward said means sensitive to said rays from a second perspective to produce a second image on said screen representative of said internal portions after said first image has decayed therefrom, storing said second image in second image storage means and displaying a previously stored second image on second image display means whereby at least one first image and one second image is presented on said first and said second image display means for visual observation simultaneously.

7. An X-ray system comprising, a normally inactive source of X-rays, X-ray sensitive means for storing a visible image due to X-rays for only a first relatively short period of time, means for directing X-rays from said source to said X-ray sensitive means, means for converting said visible image into a video signal representative thereof, long term storage means for storing images for a second period of time much longer than said first period, image display means for presenting a visual representation of images due to exposure from said X-rays, means for activating said source for a first time interval much shorter than said second period, means for transferring said video signal to said long term storage means for storage therein within a second time interval having a duration less than said first period and immediately following said first time interval, and means for transferring the latter stored video signal to said image display means during a third time interval following said first time interval, said second period being at least equal to the time interval between the termination of said first time interval and the termination of said third time interval.

8. Apparatus in accordance with claim 7 wherein said scanning means comprises a television camera, and said long term storage means comprises an image storage tube unit.

9. Apparatus in accordance with claim 8 wherein said image display means comprises a television picture tube.

10. A stereoscopic X-ray system comprising, X-ray sensitive means for storing an image thereon due to X-rays for only a first relatively short period of time, normally inactive means for providing X-rays from first and second spaced points directed toward said X-ray sensitive means and penetrating a common volume between said sources and said X-ray sensitive means, means for scanning said image to provide a video signal representative thereof, first and second long term storage means each for storing images for a second period of time much longer than said first period, first and second image display means for presenting a visual representation of images due to exposure from said X-rays, means for activating said source for a first time interval much shorter than said second period to provide X-rays from said first point, means for transferring said video signal to said first long term storage means for storage therein within a second time interval having a duration less than said first period and immediately following said first time interval, means for transferring the latter stored video signals to said first image display means during a third time interval following said first time interval, means for activating said source for a fourth time interval much shorter than said second period following said second time interval to provide X-rays from said second point, means for transferring said video signal to said second long term storage means for storage therein within a fifth time interval having a duration less than said first period and immediately following said fourth time interval, and means for transferring the latter stored video signal to said second image display means during a sixth time interval following said fifth time interval, said second period being at least equal to the longer of the time intervals between the terminations of said first and third time intervals and between the terminations of said fourth and sixth time intervals.

11. Apparatus in accordance with claim 10 wherein said scanning means comprises a television camera, and said first and second long term storage means comprise image storage tube units.

12. Apparatus in accordance with claim 11 wherein said first and second image display means comprise television picture tubes.

13. Apparatus in accordance with claim 10 wherein said first long term storage means comprises first and second image storage tube units, said second long term storage means comprises third and fourth image storage tube units, and further comprising, means for cyclically repeating said occurrences in said first, second, third, fourth, fifth and sixth, time intervals, means for transferring said video signal to said first and third storage tube units and said signals stored in long term storage means from said second and fourth storage tube units to said first and second image display means respectively during alternate cycles in which said occurrences are repeated, and means for transferring said video signal to said second and fourth storage tube units and said signals stored in long term storage means from said first and third storage tube units to said first and second image display means respectively during the remaining cycles in which said occurrences are repeated.

14. Apparatus in accordance with claim 13 wherein said first and second image display means respectively comprise first and second television picture projection tubes, and further comprising, an image display screen, a half-silvered mirror for transmitting the image on one of said projection tubes toward said image display screen and reflecting the image on the other projection tube toward said image display screen, first and second polarization selective filters between said first and second projection tubes respectively and said half-silvered mirror, and means for focussing the light rays from said mirror upon said image display screen to superimpose the images on said first and second projection screens thereon to permit an observer with polarization sensitive filters covering each eye to observe only one superimposed image with one eye and only the other with the other eye.

15. An object penetrative ray system comprising, a source of object penetrative rays, means sensitive to said rays for storing a visible image due to said rays for only a first relatively short period of time, means for selectively directing said rays from said source to said ray sensitive means, means for converting said visible image into a video signal representative thereof, long term storage means for storing images for a second period of time much longer than said first period, image display means for presenting a visual representation of images due to exposure from said rays, means for effecting the direction of rays from said source to said ray sensitive means for a first time interval much shorter than said second period, means for transferring said video signal to said long term storage means for storage therein within a second time interval having a duration less than said first period and immediately following said first time interval, and means for transferring the latter stored video signal to said image display means during a third time interval following said first time interval, said second period being at least equal to the time interval between the termination of said first time interval and the termination of said third time interval.

References Cited in the file of this patent

UNITED STATES PATENTS

| | | |
|---|---|---|
| 2,307,188 | Bedford | Jan. 5, 1943 |
| 2,550,316 | Wilder | Apr. 24, 1951 |
| 2,696,523 | Theile | Dec. 7, 1954 |
| 2,730,566 | Bartow | Jan. 10, 1956 |
| 2,747,131 | Sheldon | May 22, 1956 |

FOREIGN PATENTS

| | | |
|---|---|---|
| 1,158,931 | France | June 20, 1958 |